(12) United States Patent
Glass

(10) Patent No.: US 8,142,711 B2
(45) Date of Patent: Mar. 27, 2012

(54) FORGED COPPER BURNER ENCLOSURE

(75) Inventor: Joshua W. Glass, Charlevoix, MI (US)

(73) Assignee: Nu-Core, Inc., Charlevoix, MI (US)

( * ) Notice: Subject to any disclaimer, the term of this patent is extended or adjusted under 35 U.S.C. 154(b) by 348 days.

(21) Appl. No.: 12/416,961

(22) Filed: Apr. 2, 2009

(65) Prior Publication Data

US 2010/0252968 A1     Oct. 7, 2010

(51) Int. Cl.
*C21B 7/02* (2006.01)
(52) U.S. Cl. .................................. 266/241; 266/270
(58) Field of Classification Search .................. 266/270, 266/241
See application file for complete search history.

(56) References Cited

U.S. PATENT DOCUMENTS

| | | | |
|---|---|---|---|
| 2,781,190 A | 3/1951 | Weir | |
| 4,622,007 A | 11/1986 | Gitman | |
| 4,752,330 A | 6/1988 | Gitman | |
| 5,490,775 A | 2/1996 | Joshi et al. | |
| 5,599,375 A | 2/1997 | Gitman | |
| 5,714,113 A | 2/1998 | Gitman et al. | |
| 5,788,921 A | 8/1998 | Gitman et al. | |
| 5,814,125 A | 9/1998 | Anderson et al. | |
| 5,823,762 A | 10/1998 | Anderson et al. | |
| 5,843,368 A | 12/1998 | Gitman et al. | |
| 5,858,302 A | 1/1999 | Gitman et al. | |
| 5,904,895 A | 5/1999 | Gitman et al. | |
| 5,927,960 A | 7/1999 | Felderman | |
| 5,931,654 A | 8/1999 | Chamberland | |
| 5,954,855 A | 9/1999 | Gitman et al. | |
| 6,096,261 A | 8/2000 | Anderson et al. | |
| 6,125,133 A | 9/2000 | Mathur et al. | |
| 6,171,544 B1 | 1/2001 | Anderson et al. | |
| 6,176,894 B1 | 1/2001 | Anderson et al. | |
| 6,334,976 B1 | 1/2001 | Anderson et al. | |
| 6,289,035 B1 | 9/2001 | Shver | |
| 6,372,010 B1 | 4/2002 | Shver et al. | |
| 6,383,445 B1 | 5/2002 | Anderson et al. | |
| 6,400,747 B1 | 6/2002 | Mathur | |
| 6,450,799 B1 | 9/2002 | Mahoney et al. | |
| 6,604,937 B1 | 8/2003 | Mahoney | |
| 6,614,831 B2 | 9/2003 | Shver | |
| 6,773,484 B2 | 8/2004 | Mahoney et al. | |
| 6,805,724 B2 | 10/2004 | Shver | |
| 7,483,471 B2 * | 1/2009 | Shver | 373/76 |
| 2002/0096809 A1 | 7/2002 | Shver et al. | |

OTHER PUBLICATIONS

US 6,432,086, 06/2002, Shver (withdrawn)

* cited by examiner

*Primary Examiner* — Scott Kastler
(74) *Attorney, Agent, or Firm* — VanOphem & VanOphem PC

(57) ABSTRACT

A forged copper burner enclosure capable of being mounted within the side wall of a steel melting furnace for the purpose of providing an improved cooling characteristic to a burner lance. The burner enclosure is provided with a central passage adapted to receive a burner lance for injecting oxygen into the batch of molten metal of an electric arc furnace. The forged burner enclosure is positioned such that only a solid forged copper face is on the furnace side when installed. The burner enclosure has an optional through hole which can be used for the purpose of treating the metal melt with particulate supply ranging from slag forming materials to metallurgical materials. The burner enclosure further has a number of coolant holes and tubes which provide a unique bidirectional flow of cooling fluid through each hole and increases cooling fluid velocity while reducing stalling and hot spots of the cooling fluid thereby providing better heat transfer and physical characteristics over cast or weld-assembled burner enclosures.

15 Claims, 8 Drawing Sheets

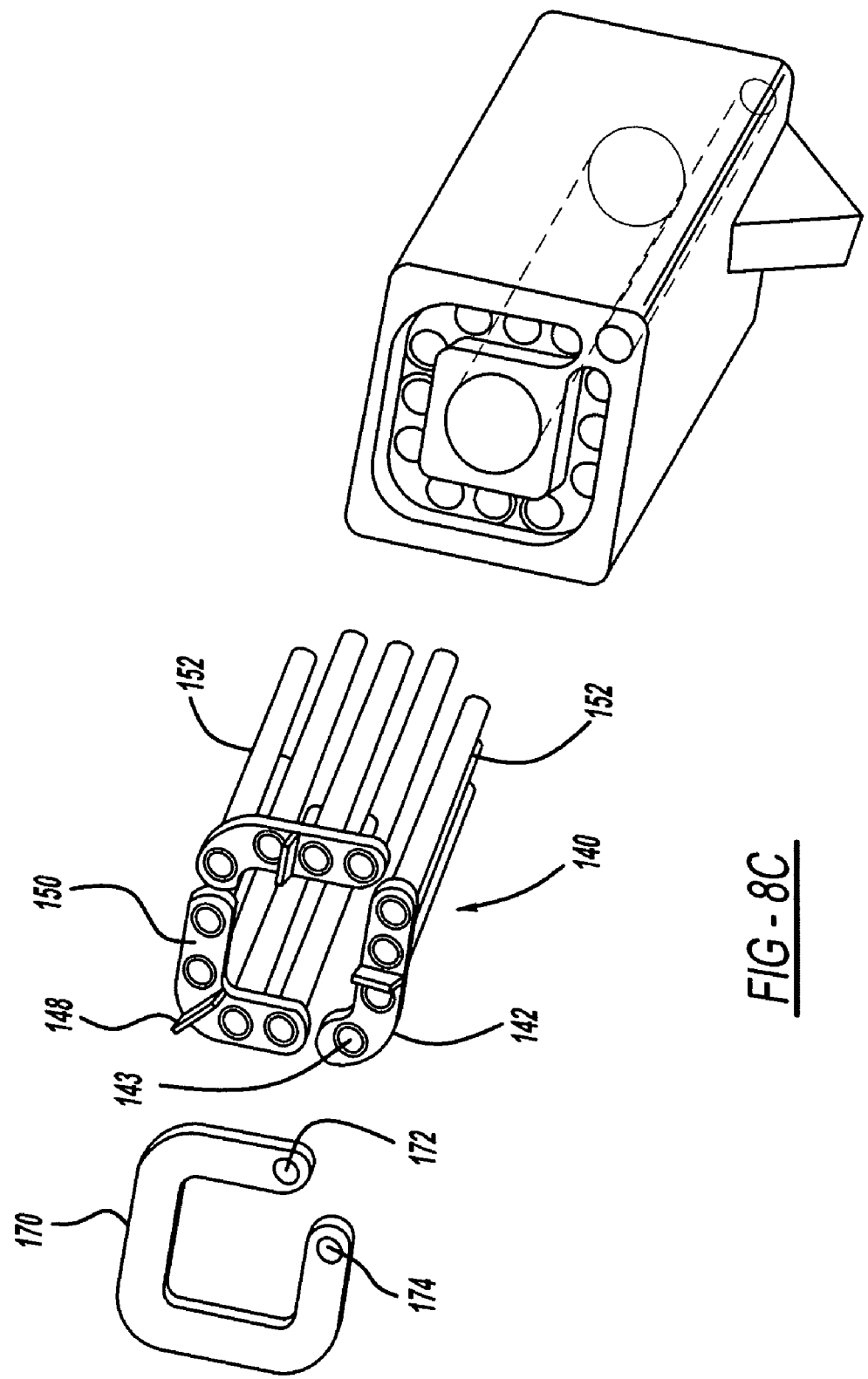

US 8,142,711 B2

FORGED COPPER BURNER ENCLOSURE

CROSS-REFERENCE TO RELATED APPLICATIONS

Not applicable.

BACKGROUND OF THE INVENTION

1. Field of the Invention

The invention generally relates to an improved liquid cooled forged burner enclosure for holding a burner or lance to inject oxygen into an electric arc furnace during the steel making process and more particularly to a cooling arrangement for a burner enclosure surrounding a central duct for the supply of oxygen which is blown into the bath of molten steel.

2. Description of the Prior Art

In an effort to increase efficiency of the steel producing process and reduce the overall manufacturing costs, steel producers have, for the past few years, evolved to using oxidizing gases, preferably oxygen in the melting, refining, and processing steps of making steel in an electric arc furnace. Oxygen is used at different points in the melting and refining process in an electric arc furnace. Initially, it may be used to add heat during the pre-heating phase of a melt or to assist in the formation of a foamy slag during or at the end of the melting phase, and to de-carbonize the molten bath during refining. This practice has resulted in the creation of a relatively significant industry relating to the practice of injecting gases as well as solids into an electric arc steel making furnace during the steel manufacturing process.

The practice of injecting gases into a steel making furnace has progressed from mechanically controlled injectors to injectors mounted in the sidewall of a furnace to the current emerging technology of fixed position burners, that is, injectors that protrude out into the furnace in a copper "tile box", "burner enclosure", "nose panel", or various other terms.

Metz et al., U.S. Pat. No. 4,369,060, discloses a plurality of agitating injectors incorporated in its refractory lining, for blowing the agitated gas, located in the bottom of the crucible, along a circle in the immediate vicinity of the sidewall of the furnace lining. Chang, U.S. Pat. No. 4,047,936, discloses imbedded concentric double-tube injectors for introducing oxygen enveloped by a shielding gas into the interior of the steel bath to oxidize impurities. Also, an overhead water cooled lance may be used to enter the vessel in the vertical position through the mouth opening. The overhead lance is attached to a rotary arm which in turn is supported by a sliding column with the lance entering the converter through a hole in the hood by rotating the arm clockwise and leaving the converter by rotating the arm counter-clockwise. Obviously, the life time of such mechanically controlled injectors or injectors built in the sidewall of the furnace itself is equal to that of the crucible and thereafter, the furnace lining needs to be rebuilt. Further, overhead water cooled lances such as disclosed by Metz, et al., while being able to be submerged directly into the molten bath to efficiently place gases and materials in a reaction zone are cumbersome and must be lowered vertically through the top of a steel making vessel. Because of their weight and size, they are not very useful to reach or be positioned for effective injection in an electric arc furnace.

These early problems evolved into the introduction of fixed position burners/injectors that protrude out into the furnace. When injecting gas into a liquid pool, it is desirable to have as much gas as possible flow into the liquid to carry out the intent/objective of the gas injection. When a nozzle of a burner lance is spaced too high above the liquid surface, then the gas impinging on the surface of the liquid will be deflected at the surface of the liquid and will not enter the liquid pool. Further, such action causes splashing of the liquid which can result in heat damage to the burner. One conventional method for reducing heat damage to a burner is to circulate a coolant such as water through the burner. Since most burners are made from copper castings or fabricated copper/steel weldments, the burner design itself is considerably more complicated to accommodate the coolant passages. Further, the cooling channels of the burner enclosure associated with the burner, due to the nature of the casting process, develop isolated "hot spots" which is an inherent design characteristic. Also, such mold design issues can cause stalling of the coolant flow in reduced service life due to wear of the casting. Also, as stated above, such burners are prone to damage as a result of the hot melt splashing on the burner tip in the harsh environment.

To avoid severe damage to the equipment, attempts have been made to recess the burner from the furnace or combustion zone. Generally, in such cases, the burner is recessed within a cavity in the furnace wall. In such arrangement, less heat or energy from the combustion zone is radiated to the burner surface and thus a coolant may not be needed by relying on the coolant passing through the furnace wall, surrounding the cavity in which the burner is recessed. Heat transfer by the radiation from the furnace decreases as the burner is withdrawn into the furnace wall cavity. However, with a burner recessed within a cavity, combustion may, and usually does occur within the cavity thus generating heat close to the burner surface and again increasing heat to the burner which may cause corrosion of the castings and reduce its efficiency. Further, if the burner is a weldment, such are prone to weld failures, which may cause water to leak into the furnace in the case of a water cooled burner. Also, recessing the burner in the furnace wall increases the distance to the molten metal, reducing its efficiency Shver, U.S. Pat. No. 6,289,035 discloses such mounting arrangement. In Shver, the mounting block is fluid cooled to survive the hostile environment of the electric arc furnace. During the refining or decarburizing phase, the metal continues to be heated by the arc until slag forming materials combine with impurities in the iron carbon melt and rise to the surface as slag. When the iron carbon melt reaches a boiling temperature, the charged carbon in the melt combines with any oxygen present in the bath to form carbon monoxide bubbles which rise to the surface of the bath. At this point, supersonic flows of oxygen are blown at the bath with the fixed burner lance to provide a de-carbonization of the bath by oxidation of the carbon contained in the bath. By injecting the bath with oxygen, the carbon content of the bath is reduced to under two percent (2%) whereby the iron carbon melt becomes steel. The mounting block protects the burner apparatus from the harsh environment.

What is needed is a burner enclosure having an outer configuration which can be modified to fit an existing opening in the wall of an electric arc furnace. The burner enclosure provides a central passage adapted to receive a lance or burner injecting oxygen into the bath of molten metal of an electric arc furnace. The burner enclosure should not have welds on the furnace side to minimize the chance of coolant water leaking into the furnace. The coolant flow in the burner enclosure must be efficient and uniform to avoid stalling and hot spots so as to provide better heat transfer and physical characteristics over cast burner enclosures.

SUMMARY OF THE INVENTION

The invention provides a forged burner enclosure for a burner, lance, or similarly named apparatus and an improved configuration for mounting such apparatus in an existing opening of the wall of an electric arc welding furnace for steel making.

In the preferred embodiment, the burner enclosure is fabricated from a copper forging which is machined with a centrally disposed through hole along the longitudinal axis of the burner enclosure and is adapted to receive a lance or burner for providing oxygen to an electric arc furnace. Surrounding this central opening or hole is a machined arcuate counterbore. Within the arcuate counterbore, are machined a plurality of equal sized kidney-shaped arcuate compartments which are circumferentially equally spaced around the central opening or hole. Within each arcuate compartment is an even number of evenly spaced deep drilled blind holes. (If the enclosure has 10 deep drilled blind holes, there will be 5 kidney-shaped arcuate compartments, each having 2 deep drilled blind holes; if 12 deep drilled blind holes are machined in the enclosure, there can be either 3 or 6 kidney-shaped arcuate compartments, and each compartment will have four or two deep drilled blind holes respectively; while if six deep drilled blind holes are present, there will be three arcuate compartments, each having 2 deep drilled blind holes.) The preferred embodiment shown has three kidney-shaped arcuate compartments and 12 deep drilled blind holes, therefore each of the equally spaced arcuate compartments will have four evenly spaced deep drilled blind holes.

In each arcuate compartment is sealably mounted a header plate which is shaped to conform to the arcuate compartment periphery. Further, each header plate has four evenly spaced apertures that communicate with four tubes that are sealably mounted and aligned with respective blind holes. The tubes extend outwardly from the bottom of the header plate. The tubes are shorter in length than the depth of each of the deep drilled blind holes machined into the burner enclosure. Therefore, each hole has a chamber between the end of the tube and the bottom wall of the blind hole so that water flowing down each tube can flow through the chamber and back up towards the header plate between the outside diameter of the tube and the insider diameter of the wall of the deep drilled blind hole in the burner enclosure. Since the deep drilled blind holes are considerably larger than the outside diameter of the tube mounted in each hole a continuous flow path of coolant is established for each tube and deep drilled blind hole combination. The flow path allows cooling water to flow down inside the tube into the chamber at the bottom of each hole where the coolant is further directed to flow upward between the outer wall of the tube and the inner wall of the hole.

In order to establish a continuous flow through the entire burner enclosure each header plate is provided with a divider plate which separates the first two of the four tubes from the adjacent two tubes of the four tubes mounted to each header plate. With the divider plates sealably secured in place, the space above the header plate is divided into four separate chambers once a cover plate is sealably mounted to the burner enclosure. Also, since the header plate is mounted into the arcuate compartment at a location above the bottom surface of the arcuate compartment a chamber is created underneath the header plate which permits communication between the four holes common to each kidney-shaped arcuate compartment.

Therefore, it is an object of the invention to provide a burner enclosure for an oxygen lance or burner which is durable and not prone to erosion and cracking or weld failures.

It is yet a further object of the invention to provide a burner enclosure for an oxygen lance or burner which provides better strength and heat transfer.

It is still a further object of the invention to provide a burner enclosure for an oxygen lance or burner for an electric arc furnace for steel making which can be modified to fit existing furnace sidewalls.

It is yet a further object of the invention to provide a burner enclosure for an oxygen lance or burner which incorporates machined water channels for uniform coolant to flow through the burner enclosure thereby eliminating stalling and hot spots and increasing the life of the burner enclosure.

It is still a further object of the invention to maintain a uniform cooling water flow through the burner enclosure in order to eliminate stalling and turbulence in critical areas.

It is still a further object of the invention to maintain coolant flow at a high velocity to prevent any solid deposits from clogging cooling passages.

There are other objects, aspects, and features of the invention that will be more clearly understood and better described when the following detailed description is read in conjunction with the attached drawings.

BRIEF DESCRIPTIONS OF THE DRAWINGS

Figure 8A:
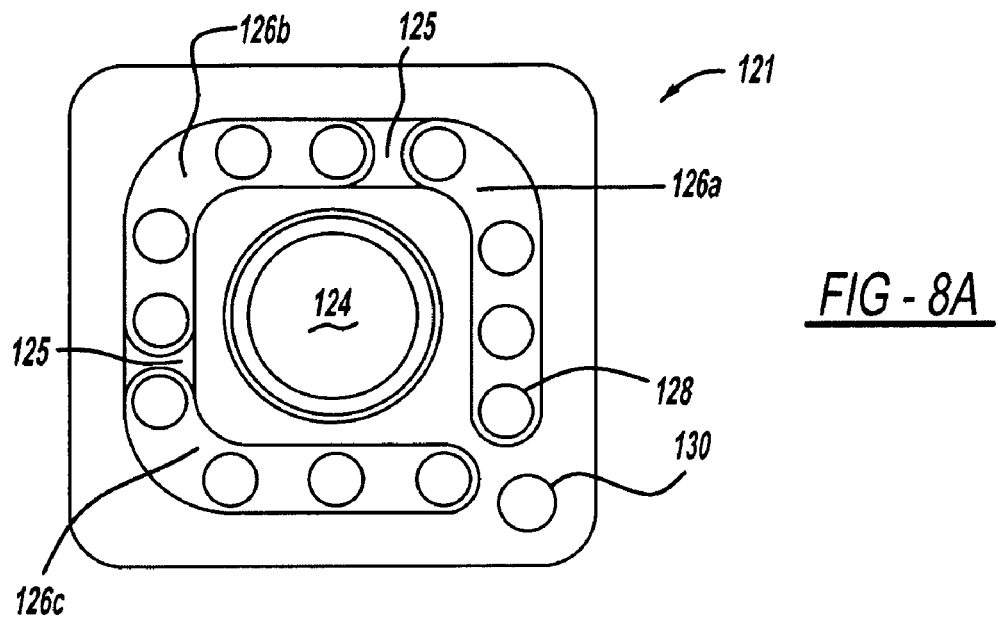
FIG. 8A is an end view of the second embodiment of a forged burner housing illustrating the machined cooling passages and peripherally spaced recessed compartments for mounting header and tube assemblies.
Figure 8B:
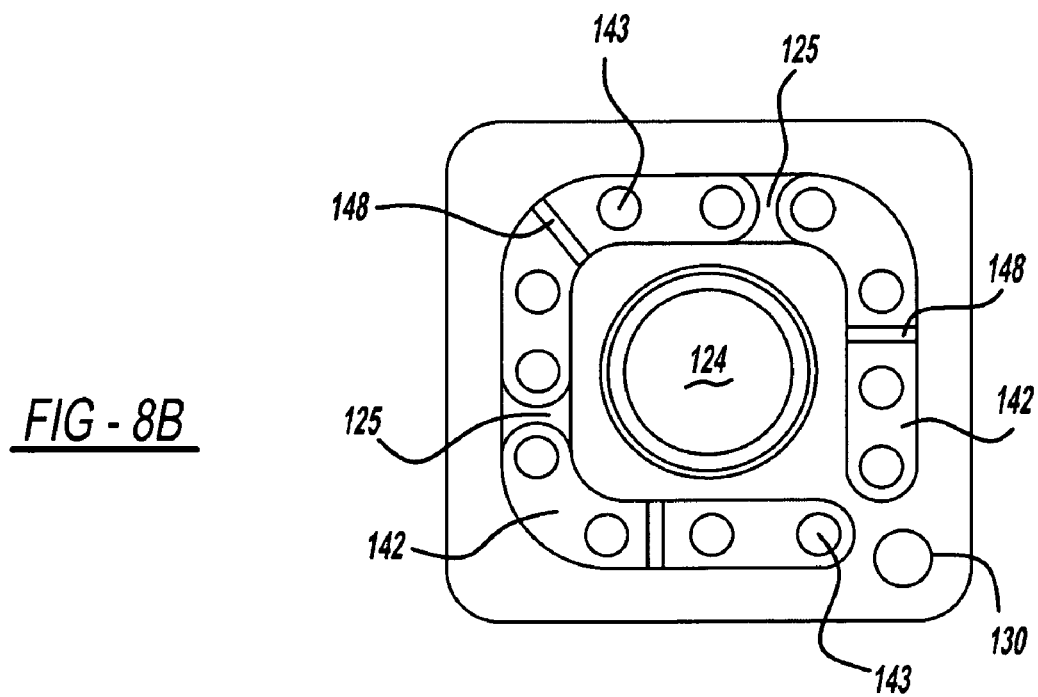

FIG. 8B is an end view of the forged burner housing with the three header and tube assemblies installed in the burner housing and the end cover removed of the second embodiment; and FIG. 8C is a perspective exploded view of the three divider plates, header and tube assemblies, cover, inlet and outlet fittings that are mounted into the burner housing to establish the various chambers through which flow a continuous stream of coolant within the second embodiment.

DETAILED DESCRIPTION OF THE PREFERRED EMBODIMENT

Figure 1:
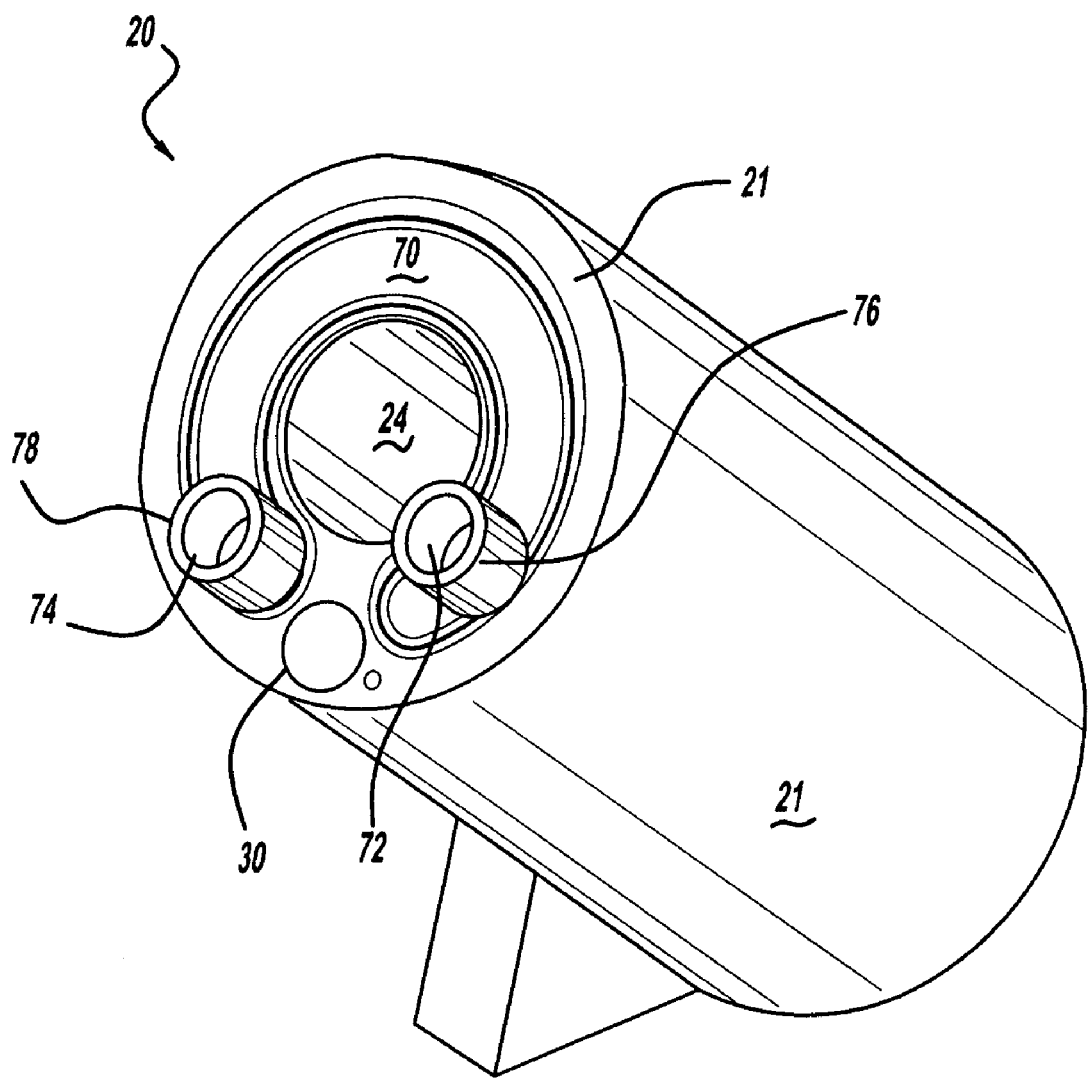
FIG. 1 is a perspective view of the forged burner housing, header and tube assemblies, and end cover with inlet and outlet ports and fittings for the coolant fluid.
Figure 2:
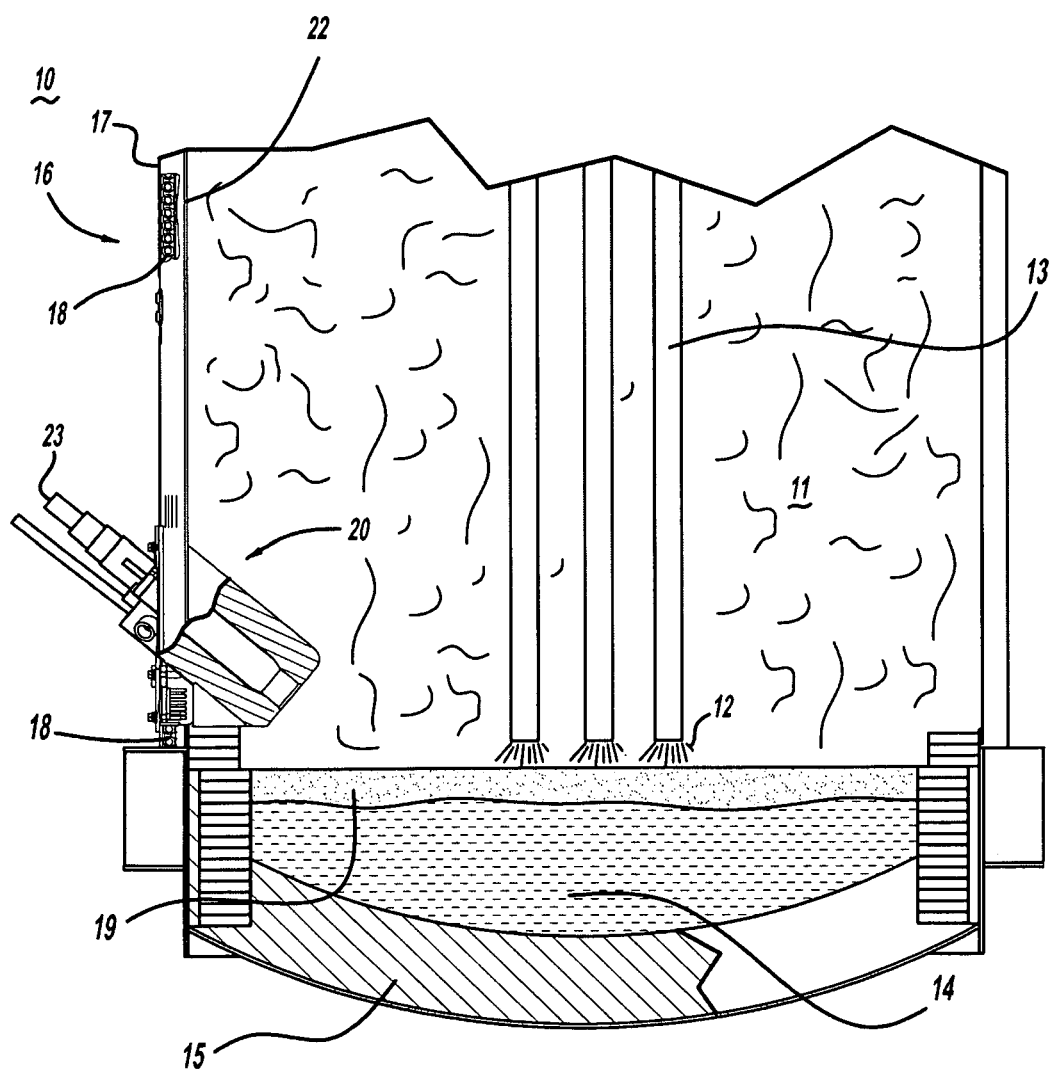
FIG. 2 is a partial sectional side view of the mounting arrangement of the invention in the furnace wall of an electric arc furnace.
Figure 5:
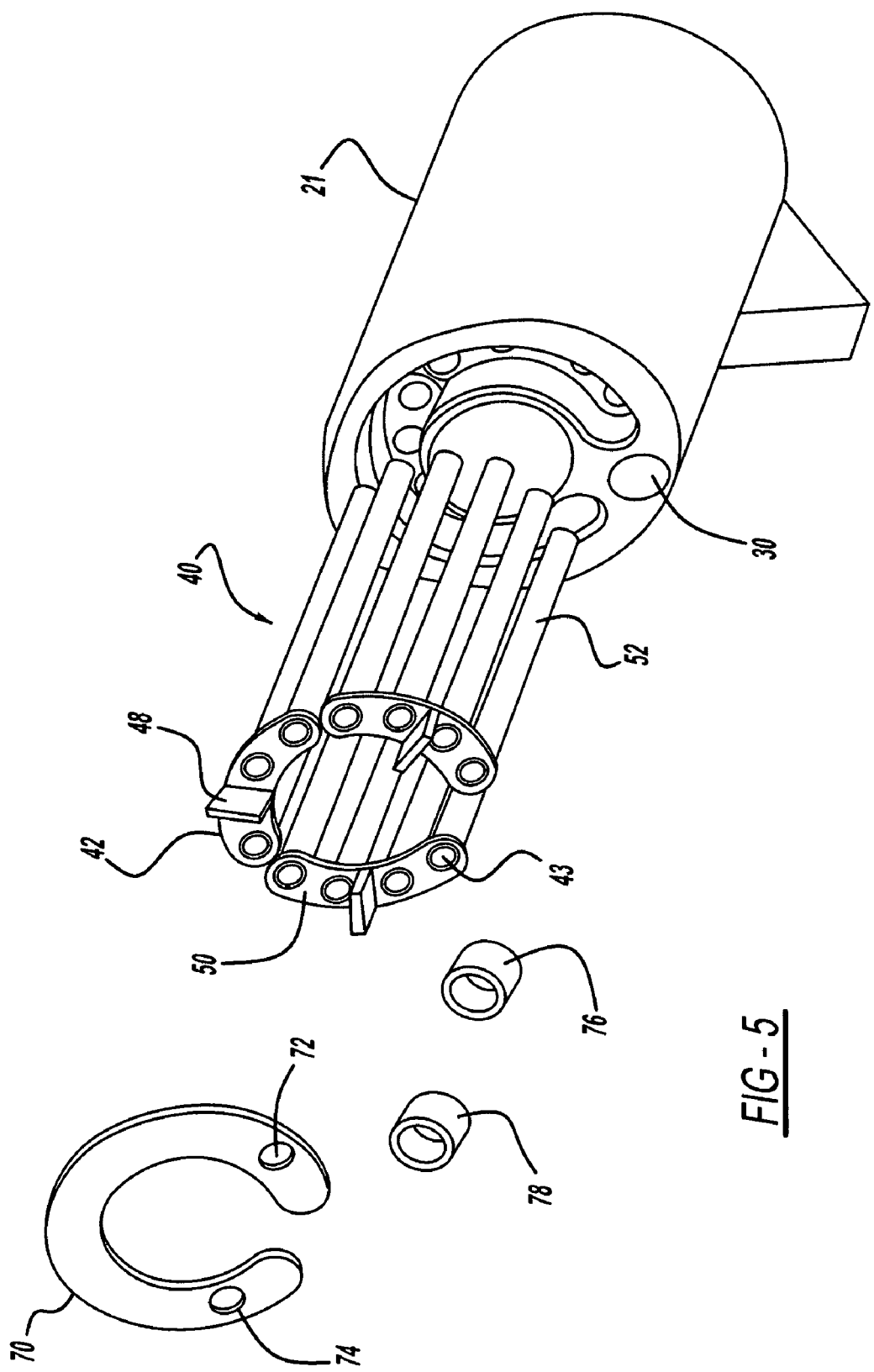
FIG. 5 is a perspective exploded view of the three divider plates, header and tube assemblies, cover, inlet and outlet fittings that are mounted into the burner housing to establish the various chambers through which flow a continuous stream of coolant.
Figure 6:
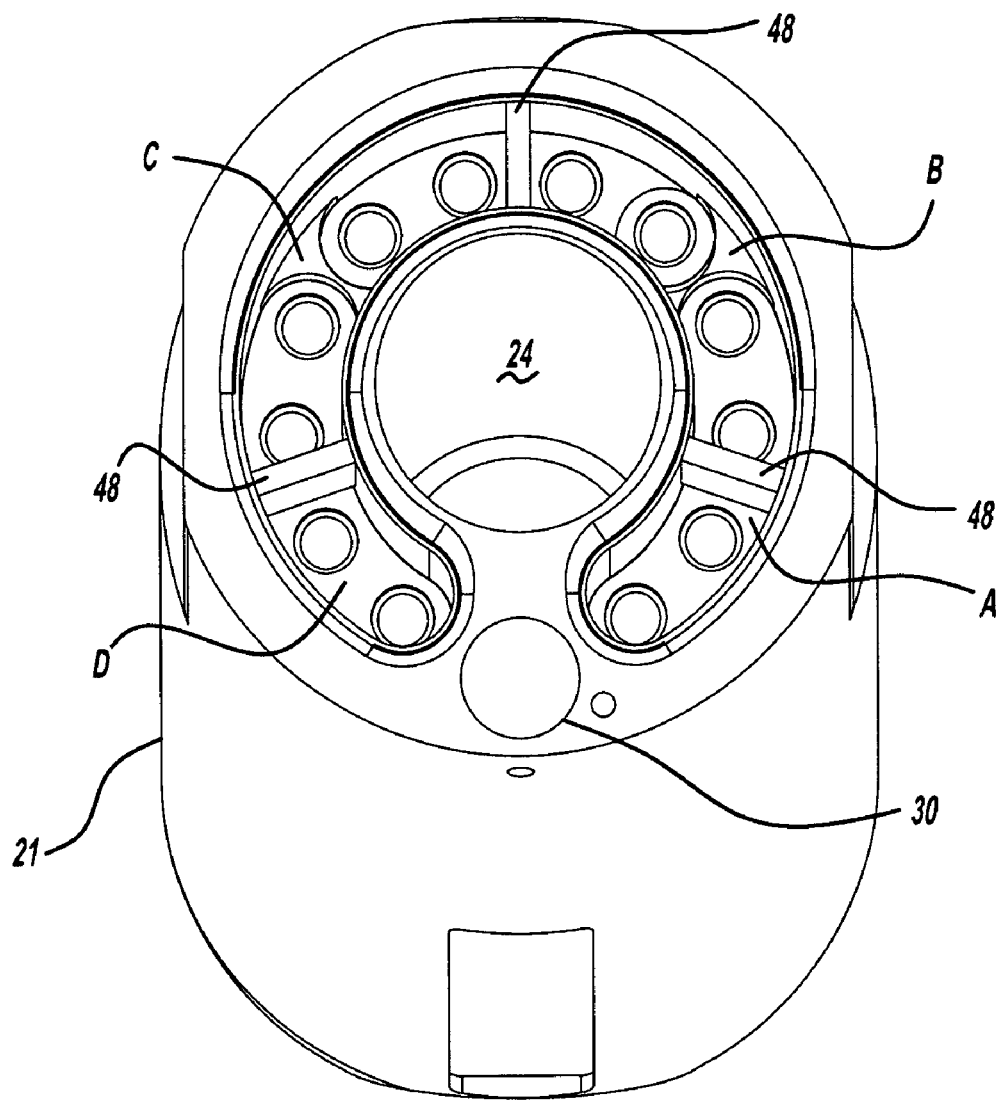
FIG. 6 is an end view of the forged burner housing with the three header and tube assemblies installed in the burner housing and the end cover removed.

In FIG. 1 (as assembled) and FIG. 5 (exploded view), there is shown a forged burner enclosure 20 in perspective consisting of a burner housing 21 with three concentrically spaced header and tube assemblies 40 which mount into deep drilled blind holes 28 at the top of arcuate compartments 26a, 26b, and 26c in the burner housing 21; and a cover plate 70 for covering the header and tube assemblies 40 containing the coolant inlet port 72 and coolant outlet port 74 with their respective inlet 76 and outlet 78 coolant fittings welded concentrically to their respective ports. The complete assembly is accomplished by welding each of the three header and tube assemblies 40 in place after they are inserted into the burner housing 21 and further welding the cover plate 70 at the top of the arcuate counterbore 25 provided in the burner housing 21 as will be described hereinafter. After assembly, the forged burner enclosure 20 is mounted in the sidewall of the shell of an electric arc furnace (EAF) as shown in FIG. 2, with a burner lance 23 mounted in the central passageway of the forged burner enclosure 20. Depending on the configuration of the furnace 10, the forged burner enclosure 20 may be mounted anywhere in the sidewall 22 of the furnace. Further, the furnace 10 may have more than one forged burner enclosure 20 mounted around its periphery, depending upon its size, configuration, and melting power. Generally, such forged burner enclosure(s) 20 are located at the cold spots in the furnace 10 to assist with the melting of the charge. These cold spots are different for DC (direct current) furnaces usually having one electrode and AC (alternating current) furnaces having three electrodes, and may be different even between these furnaces depending on the size, manufacturer, and operating procedure of the furnace.

The forged burner enclosure 20 is adapted to operate in several different modes to provide auxiliary heating, metal refining, and other processing capabilities in electric arc furnaces (EAF), or similar metal melting, refining, or processing furnaces. In FIG. 2, which illustrates a partial side view, the EAF 10 melts ferrous scrap 11 by means of an electric arc 12 produced from one or more electrodes 13 to collect as a molten metal melt 14 at its lowest point or hearth 15. The hearth 15 is made of refractory material to withstand the intense heat of the molten metal 14. The hearth 15 is surrounded by an upper wall housing which consists of a series of arcuate fluid cooled panels 16. These fluid cooled panels 16 can be of several different conventional arrangements such as illustrated in the preferred embodiment with an outer shell member 17 and a plurality of cooling coils 18. The charge or molten metal melt 14 is generally covered with variable amounts of slag 19 as a result of chemical reactions between the molten metal melt 14 and slag 19 forming materials added to the furnace during the melting process of the metal.

The forged burner enclosure 20 is normally mounted through an opening in the fluid cooling coils 18 of the outer shell member 17 of the furnace 10. The forged burner enclosure 20 is fluid cooled and generally is bolted into some form of mounting plate or rectangular shaped mounting block usually retrofitted to an existing furnace or integrated into the wall of a newly designed furnace. The forged burner enclosure 20 is received into a mounting aperture of the mounting plate so that the discharge opening of the burner lance 23 mounted within the central disposed through-passage or opening 24 of the burner housing 21 is extended beyond the edge of the refractory hearth 15. This permits the flow of materials from the discharge opening of the burner lance 23 to not interfere with the refractory material so that degradation of the refractory material is avoided. Since the forged burner enclosure 20 is fluid cooled, it can withstand the high temperatures of the internal areas of the furnace 10. This allows the burner enclosure 20 to be brought closer to the molten metal melt 14 and so that it can be more efficient in its operation. The forged burner enclosure 20 is slanted downward at an angle, preferably between 20-50 degrees, to direct the flange of the burner lance 23 towards the molten metal melt 14 in the hearth 15 of the furnace 10. In addition to its downward inclination, the forged burner enclosure 20 may also be directed from a radial position, preferably 0-20 degrees tangentially.

Figures 3, 4:
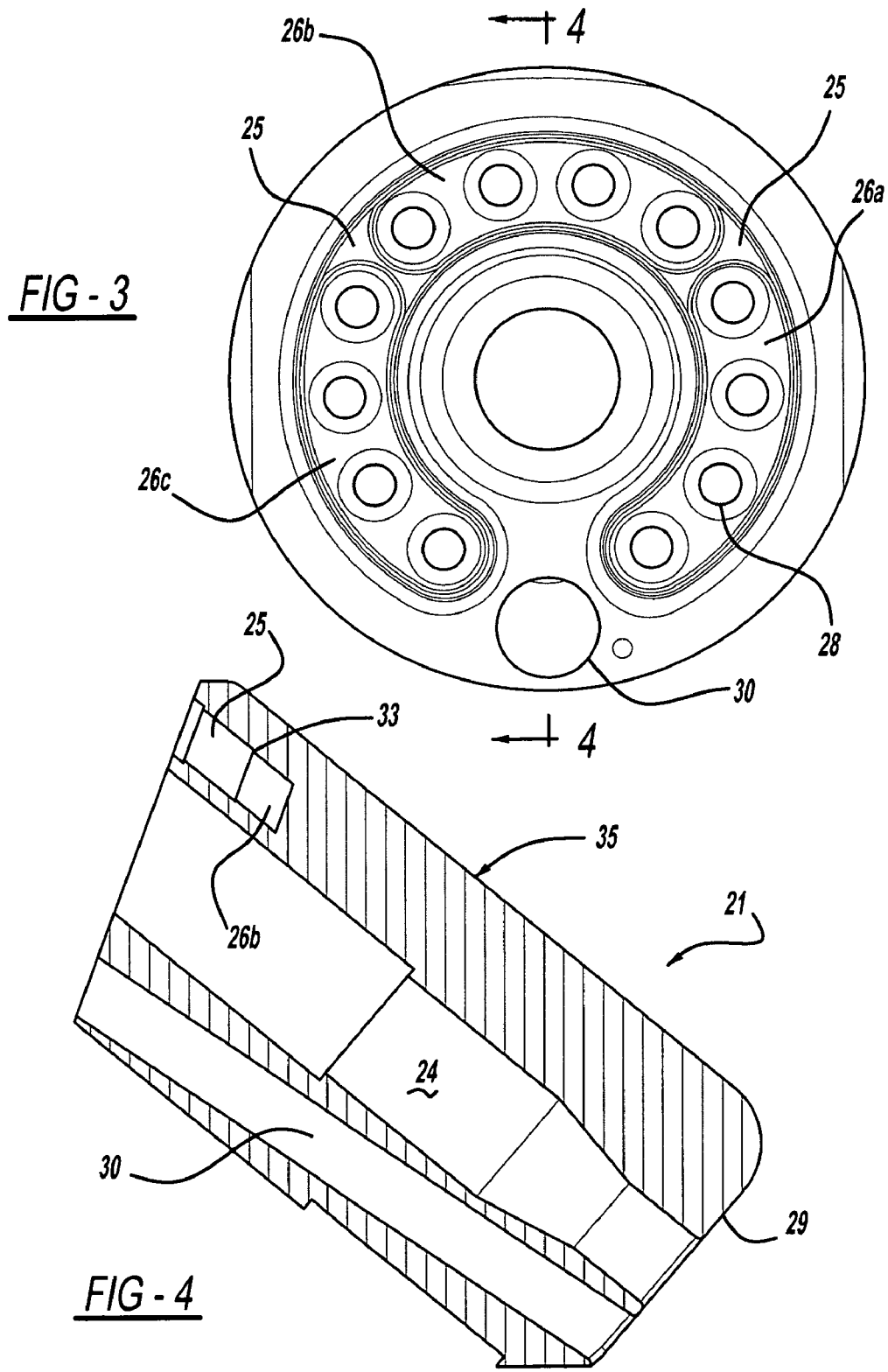
FIG. 3 is an end view of the forged burner housing illustrating the machined cooling passages and upper arc segment chambers for mounting the header plates.
FIG. 4 is a cross-section side view of the forged burner housing taken along section 4-4 of FIG. 3.

The forged burner enclosure 20 is designed to receive a burner lance 23, shown in FIG. 2, centrally mounted in central opening 24 of the burner housing 21 as shown in FIG. 4. The burner housing 21 can accommodate a variety of burner lances 23 from various manufacturers. The central opening 24 is customized to receive various sizes and configurations of burner lances 23. In the preferred embodiment shown in cross-section in FIG. 4, the central opening 24 has a tapered area complementary with a tapered area on a specific burner lance 23 used to locate the burner lance (not shown) within the burner housing 21 which in turn is mounted in the sidewall 22 of the electric arc furnace 10 as shown in FIG. 2.

Some burner lances 23 are designed with water cooling passages surrounding the gas and fuel supply passages. Other types of burner lances 23 used in conjunction with the forged burner enclosure 20 of the invention have no coolant passages and rely entirely on the water cooling arrangement of the forged burner enclosure 20.

The burner lance 23 is supplied with two utilities from an oxidizing gas supply and a fuel supply (not shown). The oxidizing gas supply provides commercially pure oxygen, although a mixture of oxygen with air or another gas is not uncommon. The fuel supply is generally natural gas but here again, a combination of fuel fluids or gases maybe used. The burner housing 21 may optionally have a longitudinal through-hole 30 as shown in FIG. 4 which serves to provide the particular supply, ranging from slag forming materials to metallurgical materials. The operation and timing of these various utilities is generally controlled by a programmed logic controller as is well known in the prior art.

With specific reference to FIGS. 3 and 4, the forged burner housing 21 illustrates one arcuate counterbore 25 and three machined arcuate compartments 26a, 26b, and 26c which are concentric to the arcuate counterbore 25 and located in the upper end of the forged burner housing 21. The arcuate counterbore 25 and the three machined arcuate compartments 26a, 26b, 26c are designed to direct water flow within the burner enclosure 20 which will hereinafter be illustrated. Each arcuate compartment 26a, 26b, 26c contains four deep drilled blind holes 28. The deep drilled blind holes 28 are each drilled to within approximately 2½ inches from the bottom end 29 of the burner housing 21 so as to present a solid forged copper face as a buffer zone between the intense heat in the furnace 10 and the coolant flowing through these blind holes 28. Monitoring of the gradual wearing away of the copper face allows time to identify potential problems and initiate repair before water leaks occur. The deep drilled blind holes 28 are evenly spaced circumferentially to provide maximum thickness of material between the blind holes 28 and uniform cooling circumferentially around the forged burner enclosure 20. Further, the deep drilled blind holes 28 are spaced from the outside diameter 35 of the burner housing 21 to provide sufficient structural rigidity to the burner housing 21 so that falling scrap within the furnace 10 that may hit the burner housing 21 will not damage the forged burner enclosure 20. As disclosed above, the burner enclosure 20 has an optional longitudinal through hole 30 to serve as a particulate supply, ranging from slag forming materials to metallurgical materials, as needed during the steelmaking process.

With reference to FIGS. 3-6, each of the three arcuate compartments 26a, 26b, 26c in the burner housing 21 are adapted to receive a header and tube assembly 40 as shown in FIG. 5. The header and tube assembly 40 is manufactured from stainless steel to prevent clogging of the water passages due to oxidation buildup. Each header and tube assembly 40 is made with the respective number of tubes 52, a header plate 42, and a divider plate 48 as shown in FIG. 5. The header plate 42 has a corresponding number of apertures 43 which are aligned with each deep drilled blind hole 28 of the burner housing 21. The tubes 52 are aligned to each header plate aperture 43 and sealably welded to the header plate 42. The divider plate 48 is welded to the top surface 50 of the header plate 42. When each of the header and tube assemblies 40 are mounted in the respective arcuate compartments 26a, 26b, 26c of the burner housing 21, the header plate 42 comes to rest on a counterbored shoulder 33 machined at the top of each arcuate compartment 26a, 26b, 26c as shown in FIG. 4. After each header and tube assembly 40 is welded into a respective arcuate compartment 26a, 26b, 26c, three watertight separated chambers 46a, 46b, 46c, are created along the lower level, below the welded header plate 42 and above the bottom surface of each arcuate compartment 26a, 26b, 26c. Each chamber 46a, 46b, 46c having the form of each arcuate compartment 26a, 26b, 26c.

The divider plates 48, as welded to each of the header plates 42 result in the formation of four upper arcuate compartments A, B, C, D as shown in FIG. 6a. These four upper compartments A, B, C, D combine with the three lower chambers and tubes 52 mounted in the deep drilled blind holes 28 of the burner housing 21 to provide continuous flow of coolant through the forged burner enclosure 20. This can only be accomplished by the use of a cover plate or cap 70 which is welded in place to the top of the arcuate counterbore 25 and each divider plate 48 of each header and tube assembly 40 to secure a watertight forged burner enclosure 20. Each of the header and tube assemblies 40 welded in their respective arcuate compartments 26a, 26b, 26c with the cover plate 70 securely welded at the top of the arcuate counterbore 25 creates four upper chambers 44a, 44b, 44c, 44d. The cover plate 70 has a coolant inlet port 72 and a coolant outlet port 74. The coolant inlet fitting 76 is welded to the cover plate 70 aligned to the coolant inlet port 72. The coolant outlet fitting 78 is welded to the cover plate 70 aligned to the coolant outlet port 74. The coolant inlet port 72 communicates with the two coolant tubes in the upper chamber 44a.

Figure 7:
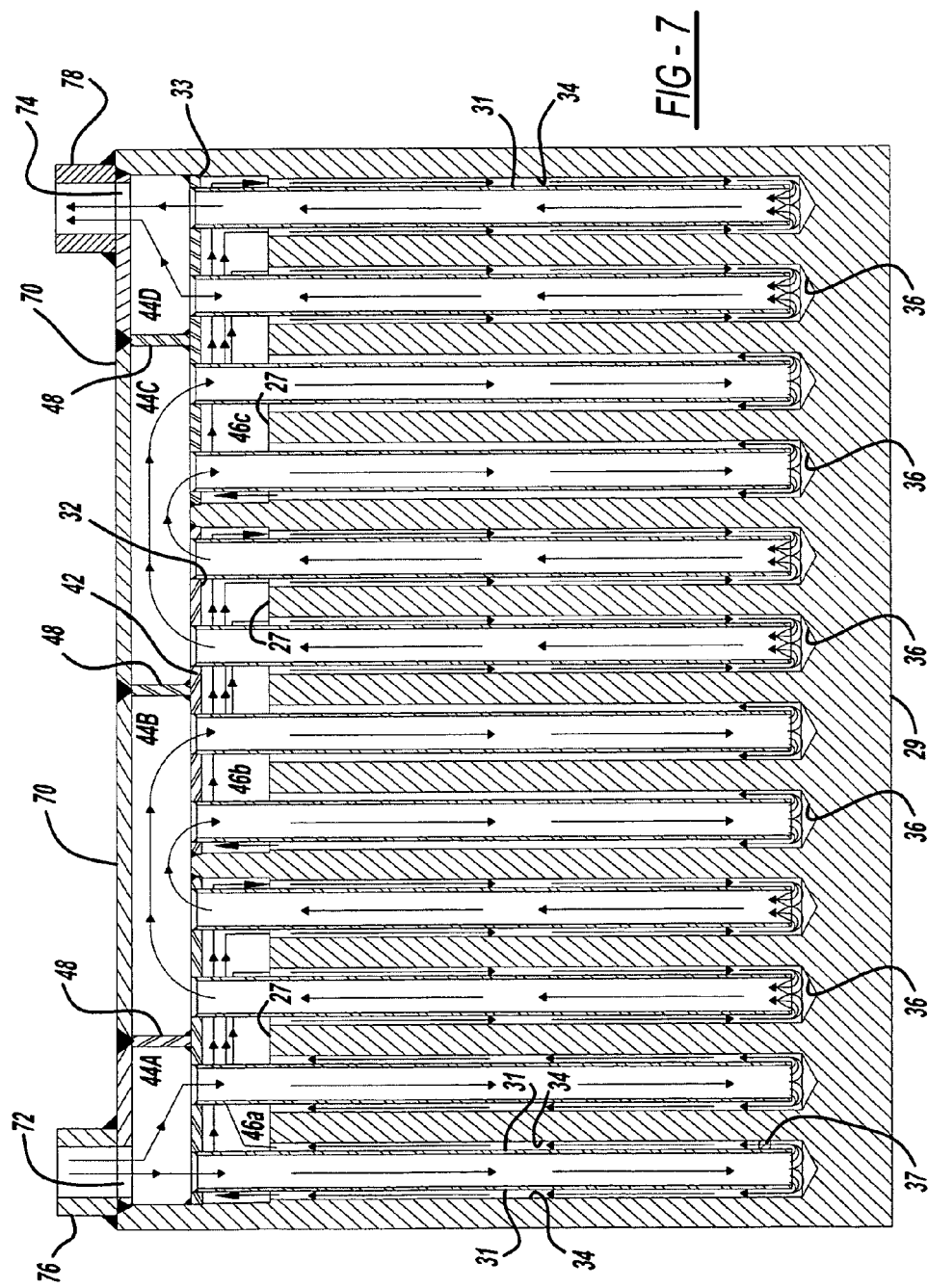
FIG. 7 is a planar layout of the hole pattern of the burner enclosure to illustrate the flow pattern of the coolant water through the burner enclosure.

Each tube 52 is suspended from its header plate 42 into a respective deep drilled blind hole 28 and centered using a spacer 37 located near the end of each tube 52 and welded to the outside diameter of each tube 52 equally spaced at 120° increments around the circumference of the tube as shown in FIG. 7. The bottom end of each tube 52 is uniformly spaced from the bottom of its respective deep drilled blind hole 28. This spacing forces cooling water to the lowest point of the forged burner enclosure 20 without restricting water flow. The preferred embodiment illustrates the use of twelve holes with tubes inserted therein. Larger burner enclosures may require more cooling and additional holes may need to be added. The flow pattern as hereinafter described would be similar.

FIG. 7 is a representation of the burner enclosure illustrating, in a flat plane, the various holes, chambers, and coolant flow paths established within the burner enclosure 20. The three lower chambers 46a, 46b, 46c are located between the bottom surface 32 of the header plate 42 mounted against the counterbored shoulder 33 at the top of each arcuate compartment 26a, 26b, 26c and the bottom surface 27 of each of the arcuate compartments 26a, 26b, 26c. The cover plate 70 is welded to the burner housing 21 as well as each of the divider plates 48 to create the watertight upper chambers 44a, 44b, 44c, 44d. For purposes of clarity the spacers 37 attached to the bottom end of each tube 52, to maintain centering of the tube 52 within each deep drilled blind hole 28 are only shown on one of the tubes 52 of FIG. 7.

As coolant enters the inlet port 72 of the cover plate 70, it is forced to flow into chamber 44a downward into the two tubes 52 that communicate with the upper chamber 44a. As the coolant reaches the bottom end of each of the two tubes 52, it impinges against the bottom end 36 of the deep drilled blind holes 28 and continues to flow upwards in the space between the outside diameter 31 of each of the two tubes 52 and the inside diameter 34 of each of the first two deep drilled blind holes 28 located in lower chamber 46a. When the upward flowing coolant reaches the lower chamber 46a, it can no longer rise further upward since the welded header plate 42 made the lower chamber 46a watertight, the coolant must now flow along the lower chamber 46a until it encounters the next two deep drilled blind holes 28 in the lower chamber 46a. Again, since the coolant cannot flow upward it will begin to flow downward between the outside diameter 31 of the tubes 52 and the inside diameter 34 of the next two deep drilled blind holes 28 in lower chamber 46a. As the coolant flows to the bottom of the deep drilled blind holes 28, it encounters the bottom end 36 of the deep drilled blind holes 28 and impinges there against causing the coolant to flow upward inside the last two tubes 52 located in the arcuate compartment 26a and rise upwards towards the upper chamber 44b. The upper chamber 44b is in fluid communication with the last two tubes 52 of the header and tube assembly 40 that is mounted in arcuate compartment 26a as well as the first two tubes 52 of the header and tube assembly 40 that is mounted in arcuate compartment 26b. Therefore, the coolant rising in the last two tubes 52 in arcuate compartment 26a flows into the upper chamber 44b and spills over into the first two tubes 52 of the header and tube assembly 40 mounted in arcuate compartment 26b. As discussed above relative to the first two tubes 52 in upper chamber 44a, the cycle now repeats itself, that is, the incoming coolant flows downward in the first two tubes 52 of arcuate compartment 26b until at the bottom of the tubes 52, the coolant encounters the bottom end 36 to impinge there against. The coolant then begins to flow upwards between the outside diameter 31 of the two tubes and the inside diameter 34 of the deep drilled blind holes 28 until it rises to the lower chamber 46b. As in the lower chamber 46a, the flow within the lower chamber 46b is in fluid communication with the next two blind holes 28 which are located in arcuate compartment 26b. Coolant flow continues downward between the outside diameter of the last two tubes 52 in lower chamber 46b and the inside diameter 34 of the deep drilled blind holes 28 and returns upward within the last two tubes 52 of arcuate compartment 26b into the upper chamber 44c. Upper chamber 44c is in fluid communication with the last two tubes 52 of the header and tube assembly 40 mounted in arcuate compartment 26b as well as the first two tubes of the header and tube assembly 40 mounted in arcuate compartment 26c. Therefore, the coolant rising in the last two tubes 52 mounted in arcuate compartment 26b flow into upper chamber 44c and continues to flow downwards in the first two tubes 52 of the header and tube assembly 40 which is mounted in arcuate compartment 26c. The coolant continues along this flow pattern through the remainder of the tubes and chambers until it flows into upper chamber 44d and exits the burner housing 21 through the coolant outlet port 74.

In order to obtain uniform coolant velocity, avoid turbulence, or prevent solid deposits from clogging along any of the cooling passages of the burner enclosure, there are certain cross-sectional area relationships that must be established. For example, the effective cross-sectional area of the two stainless tubes 52 in parallel is approximately equal to or less than the effective cross-sectional area of the coolant inlet port 72. Also, the cross-section of the area between each outside diameter 31 of each tube 52 and each inside diameter 34 of each deep drilled blind hole 28 is approximately equal to the cross-section of the inside diameter of each stainless tube 52 to assure uniform coolant flow. Uniform flow helps avoid stalling and turbulence in the most critical areas of the forged burner enclosure 20, which can cause premature failure in copper castings that do not utilize an internal cooling coil. Uniform flow within the forged burner enclosure 20 also allows for higher velocity flow of the coolant so that solid deposits are prevented from clogging cooling passages. In each of the lower chambers 26a, 26b, 26c, the coolant flows around the tubes 52 before it is advanced to the next upper chamber. Therefore, the cross-sectional area of the chambers 46a, 46b, 46c on each side of each tube 52 passing through it is approximately equal to the total cross-sectional area of the inside area of two parallel tubes 52, again to prevent turbulence and maintain a uniform flow of the coolant.

FIGS. 8A, 8B, and 8C, illustrate another embodiment of the invention wherein the burner housing has a square or rectangular configuration. With reference to FIGS. 8A, 8B, and 8C, there is shown a forged burner enclosure partial assembly 120 consisting of a burner housing 121 with three peripherally spaced header and tube assemblies 140 which mount into the recessed compartments 126a, 126b, and 126c in the burner housing 121. The tubes 152 extend into respective blind holes 128 drilled into the burner housing 121. A cover plate for covering the header and tube assemblies containing a coolant inlet port and coolant outlet port with their respective inlet and outlet coolant fittings is welded in place over the open end of the burner housing similar to the preferred embodiment. (not shown) The complete assembly is accomplished by welding each of the three header and tube assemblies 140 in place after they are inserted into their respective recessed compartments of the burner housing 121 and further welding the cover plate at the top of the step down cavity 125 provided in the burner housing 121 as will be described hereinafter.

Like the preferred embodiment, the burner housing 121 may optionally have a longitudinal through-hole 130 which serves to provide the particulate supply, ranging from slag forming materials to metallurgical materials. The operation and timing of these various utilities is generally controlled by a programmed logic controller as is well known in the prior art.

This alternate embodiment of the forged burner housing 121 illustrates a step down cavity 125, having a bottom surface 125a in its open end as well as a centrally-disposed through hole 124. Three machined recessed compartments 126a, 126b, and 126c are machined in the bottom surface 125a of the step down cavity 125 located in the forged burner housing 121. The step down cavity 125 and the three machined recessed compartments 126a, 126b, 126c with the use of the header and tube assemblies 140 are designed to direct water flow within the forged burner enclosure 120 which will hereinafter be illustrated. Each recessed compartment 126a, 126b, 126c contains four deep drilled blind holes 128. The deep drilled blind holes 128 are each drilled to within approximately 2½ inches from the bottom end 129 of the burner housing 121 so as to present a solid forged copper face as a buffer zone between the intense heat in the furnace and the coolant flowing through these blind holes 128. The deep drilled blind holes 128 are evenly spaced peripherally to provide maximum thickness of material between the blind holes 128 and uniform cooling peripherally about the burner enclosure 120. Further, the deep drilled blind holes 128 are spaced from the outside surfaces of the burner housing 121 to provide sufficient structural rigidity to the burner housing 121 so that falling scrap within the furnace that may hit the burner housing 121 will not damage the burner enclosure 120.

With reference to FIG. 8b, each of the three recessed compartments 126a, 126b, 126c in the burner housing 121 are adapted to receive a header and tube assembly 140. The header and tube assembly 140 is manufactured from stainless steel to prevent clogging of the water passages due to oxidation buildup. Each header and tube assembly 140 is made with the respective number of tubes 152, a header plate 142, and a divider plate 148. The header plate 142 has a corresponding number of apertures 143 which are aligned with each deep drilled blind hole 128 of the burner housing 121. The tubes 152 are aligned to each header plate aperture 143 and sealably welded to the header plate 142. The divider plate 148 is welded to the top surface 150 of the header plate 142. As in the preferred embodiment, when each of the header and tube assemblies 140 are mounted in their respective recessed compartments 126a, 126b, 126c of the burner housing 121, the header plate 142 comes to rest on a counterbored shoulder (not shown) machined at the top of each recessed compartment 126a, 126b, 126c. After each header and tube assembly 140 is sealably welded into its respective recessed compartment 126a, 126b, 126c, three watertight separated chambers 146a, 146b, 146c, are created along the lower level, below the level of the header plate 142. Each chamber 146a, 146b, 146c having the form of each recessed compartment 126a, 126b, 126c.

The divider plates 148 are welded to each of the header plates 142 which results in the formation of four upper compartments AA, BB, CC, DD as shown in FIG. 8b. These four upper compartments AA, BB, CC, DD combine with the three lower chambers 146a, 146b, 146c, and tubes 152 mounted in the deep drilled blind holes 128 of the burner housing 121 to provide continuous flow of coolant through the burner enclosure 120. This can only be accomplished by the use of a cover plate or cap 170 which is welded in place at the top of the step down cavity 125 and each divider plate 148 of each header and tube assembly 140 to secure a watertight burner enclosure 120.

Each tube 152 is suspended from its header plate 142 into a respective deep drilled blind hole 128 and centered using a spacer 137 located near the bottom end of each tube 152 and welded to the outside diameter 131 of each tube equally spaced at 120° increments around the circumference of the tube 152. The bottom end of each tube 152 is uniformly spaced from the bottom of its respective deep drilled blind hole 128. This spacing forces cooling water to the lowest point of the forged burner housing 121 without restricting water flow. This embodiment illustrates the use of twelve holes with tubes inserted therein. Larger burner enclosure may require more cooling and additional holes may need to be added. The flow pattern would be similar to the preferred embodiment wherein the inlet port 172 is in communication with the first tube(s) located in the upper chamber AA. The flow would continue as previously described in the preferred embodiment until the last tube(s) 152 flowing to upper chamber DD and in communication with the outlet port 174 of the cover 170.

While the invention has been described in connection with a preferred embodiment, the specification is not intended to limit the scope of the invention to the particular embodiment disclosed. On the contrary, it is intended to cover any alternatives, modifications and equivalents as may be included within the spirit and scope of the invention as defined by the appended claims. For example, the preferred embodiment discloses the coolant outlet to communicate with the upper chamber 44d. It is entirely foreseeable that as a result of reducing or increasing the number of cooling tubes/holes, the inlet or outlet can communicate directly with the lower chamber as required to reduce stalling or hot spots.

What is claimed is:

1. A forged burner enclosure apparatus comprising:
a forged burner housing having:
   an open end;
   an opposite closed end;
   a centrally disposed through-passage extending from said open end through said opposite closed end;
   an arc segment counterbore in said open end of said forged burner housing, said arc segment counterbore surrounding said through-passage and defining a wall portion and a bottom surface portion in said open end of said forged burner housing;
   a plurality of circumferentially equally spaced arcuate compartments in said bottom surface of said arc segment counterbore, each of said plurality of circumferentially equally spaced arcuate compartments having at least two blind holes therein; and
means for establishing bi-directional coolant flow in each of said at least two blind holes of each of said plurality of circumferentially equally spaced arcuate compartments.

2. The forged burner enclosure apparatus as claimed in claim 1 wherein said means for establishing bi-directional coolant flow in each of said at least two blind holes further comprises:
   an arcuate header plate member sealingly mounted in each of said equally spaced arcuate compartments defining a lower chamber, each arcuate header plate member comprising:
      an upper surface;
      a lower surface; and
      at least two apertures extending from said upper surface to said lower surface;
   at least two tubular members mounted to each said arcuate header plate member, each of said at least two tubular members sealingly attached to each said arcuate header plate member in alignment with a respective aperture of said at least two apertures in said header plate such that coolant flowing along said upper surface of said header plate member is directed to flow into one of said at least two tubular members attached to said header plate member;
   said arcuate header plate member further having a divider plate sealingly attached to said upper surface of said arcuate header plate member, and extending above said upper surface of said header plate to define a plurality of upper chambers above said arcuate header plate member, each of said plurality of upper chambers communicating with at least one of said tubular members attached to each of said header plate members in an adjacent arcuate compartment in said arc segment counterbore of said forged burner housing;
   means for sealingly covering said open end of said forged burner housing;
   means for supplying a coolant fluid to said forged burner housing; and
   means for discharging said coolant fluid from said forged burner housing, whereby coolant fluid supplied by said means for supplying coolant flows into one of said at least two tubular members to the bottom of one of said blind holes to then flow upwards between said outside diameter of said one of said at least two tubular members and the inside diameter of said one of said blind holes until said coolant reaches said lower chamber of said arcuate compartment to flow along said lower chamber into the other of said at least two blind holes so as to then flow downward between said inside diameter of said other of said at least two blind holes and said outside diameter of the other of said at least two tubular members to the bottom of said other of said blind holes so that said coolant fluid is directed to flow upward inside said other of said at least two tubular members to said upper surface of said arcuate header plate so as to be directed to flow along one of said upper chambers into an adjacent additional tubular member mounted in an adjacent arcuate compartment to repeat the coolant flow described above until said coolant flow exits said tubular member of the last of said plurality of circumferentially spaced arcuate compartments and flows into said means for discharging said coolant fluid from said forged burner housing.

3. The forged burner enclosure apparatus as claimed in claim 2 wherein said means for supplying a coolant fluid to said forged burner housing further comprises a coolant inlet fitting attached to said forged burner housing, said coolant inlet fitting having an inlet port for communicating said coolant fluid to one of said upper chambers of said forged burner housing.

4. The forged burner enclosure as claimed in claim 2 wherein said means for discharging said coolant fluid further comprises a coolant outlet fitting attached to said forged burner housing, said coolant outlet fitting having an outlet port for communicating said coolant fluid from one of said upper and said lower chambers of said forged burner housing.

5. The forged burner enclosure apparatus as claimed in claim 2 wherein said means for sealingly covering said open end of said forged burner housing further comprises:
   a cover plate member sealingly mounted in said arc segment counterbore and contiguous said divider plate attached to said upper surface of said arcuate header plate member, said cover plate member having an inlet aperture at one end and an outlet aperture at an opposite end thereof;
   a coolant inlet fitting mounted to said cover plate member aligned with said inlet aperture, such that coolant fluid that enters said inlet aperture directs said fluid into said inlet aperture and said upper chamber of said forged burner housing;
   a coolant outlet fitting mounted to said cover plate member aligned with said outlet aperture, whereby coolant fluid that exits said upper chamber is directed through said outlet aperture and outlet fitting.

6. A forged burner enclosure apparatus comprising:
a forged burner housing having:
   an open end;
   an opposite closed end;
   a centrally disposed through-passage extending from said open end through said opposed closed end;
   an arc segment counterbore in said open end of said forged burner housing, said arc segment counterbore surrounding said through-passage and defining a wall portion and a bottom surface portion in said open end of said forged burner housing;
   a plurality of circumferentially equally spaced arcuate compartments in said bottom surface of said arc segment counterbore, each of said plurality of circumferentially equally spaced arcuate compartments having at least four blind holes therein; and means for establishing bi-directional coolant flow in each of said at least four blind holes of each of said plurality of circumferentially equally spaced arcuate compartments.

7. The forged burner enclosure apparatus as claimed in claim 6 wherein said means for establishing bi-directional coolant flow in each of said at least four blind holes further comprises:
an arcuate header plate member sealingly mounted in each of said equally spaced compartments defining a lower chamber, each arcuate header plate member comprising:
an upper surface;
a lower surface; and
at least four apertures extending from said upper surface to said lower surface;
at least four tubular members mounted to each said arcuate header plate member, each of said at least four tubular members sealingly attached to each said arcuate header plate member in alignment with a respective aperture of said at least four apertures in said header plate such that coolant flowing along said upper surface of said header plate member is directed to flow into at least two of said four tubular members attached to said header plate member;
said arcuate header plate member further having a divider plate sealingly attached to said upper surface of said arcuate plate member, and extending above said upper surface of said header plate to define a plurality of upper chambers above said arcuate header plate member, each of said plurality of upper chambers communicating with at least two tubular members in each said header plate members located in adjacent arcuate compartments in said arc segment counterbore of said forged burner housing;
means for sealingly covering said open end of said forged burner housing;
means for supplying a coolant fluid to said forged burner housing; and
means for discharging said coolant fluid from said forged burner housing, whereby coolant fluid supplied by said means for supplying coolant flows into two of said at least four tubular members of said arcuate header plate member to the bottom of two of said blind holes to then flow upwards between said outside diameter of each one of said at least two tubular hole members and the inside diameter of each of said two blind holes until said coolant reaches said lower chamber of said arcuate compartment to flow along said lower chamber into the other two of said four blind holes so as to then flow downward between the inside diameter of said other two of said at least four blind holes and said outside diameter of the other two of said at least four tubular members to the bottom of said other two blind holes so that coolant is directed to flow upward inside said two other of said at least four tubular members to said upper surface of said arcuate header plate so as to be directed to flow along one of said upper chambers into two additional tubular members of an adjacent arcuate compartment to report the coolant flow described above until said coolant flow exits said two tubular members of the last of said plurality of circumferentially spaced arcuate compartments and flows into said means for discharging said coolant fluid from said forged burner housing.

8. The forged burner enclosure apparatus as claimed in claim 7 wherein said means for supplying a coolant fluid to said forged burner housing further comprises a coolant inlet fitting attached to said forged burner housing, said coolant inlet fitting having an inlet port for communicating said coolant fluid to one of said upper chambers of said forged burner housing.

9. The forged burner enclosure as claimed in claim 7 wherein said means for discharging said coolant fluid further comprises a coolant outlet fitting attached to said forged burner housing, said coolant outlet fitting having an outlet port for communicating said coolant fluid from one of said upper and said lower chambers of said forged burner housing.

10. The forged burner enclosure apparatus as claimed in claim 7 wherein said means for sealingly covering said open end of said forged burner housing further comprises:
a cover plate member sealingly mounted in said arc segment counterbore and contiguous said divider plate attached to said upper surface of said arcuate header plate member, said cover plate member having an inlet aperture at one end and an outlet aperture at an opposite end thereof;
a coolant inlet fitting mounted to said cover plate member aligned with said inlet aperture, such that coolant fluid that enters said inlet aperture directs said fluid into said inlet aperture and said upper chamber of said forged burner housing;
a coolant outlet fitting mounted to said cover plate member aligned with said outlet aperture, whereby coolant fluid that exits said upper chamber is directed through said outlet aperture and outlet fitting.

11. A forged burner enclosure apparatus comprising:
a forged burner housing having:
an open end;
an opposite closed end;
a centrally disposed through-passage extending from said open end through said opposite closed end;
a step down cavity in said open end of said forged burner housing, said step down cavity partially surrounding said through-passage and defining a wall portion and a bottom surface portion in said open end of said forged burner housing;
a plurality of peripherally spaced recessed compartments in said bottom surface of said step down cavity, each of said plurality of peripherally spaced recessed compartments having at least two blind holes therein; and
means for establishing bi-directional coolant flow in each of said at least two blind holes of each of said plurality of peripherally spaced recessed compartments.

12. The forged burner enclosure apparatus as claimed in claim 11 wherein said means for establishing bi-directional coolant flow in each of said at least two blind holes further comprises:
a header plate member sealingly mounted in each of said peripherally spaced recessed compartments defining a lower chamber, each header plate member comprising:
an upper surface;
a lower surface; and
at least two apertures extending from said upper surface to said lower surface;
at least two tubular members mounted to each said header plate member, each of said at least two tubular members sealingly attached to each said header plate member in alignment with a respective aperture of said at least two apertures in said header plate such that coolant flowing along said upper surface of said header plate member is directed to flow into one of said at least two tubular members attached to said header plate member;
said header plate member further having a divider plate sealingly attached to said upper surface of said arcuate header plate member, and extending above said upper surface of said header plate to define a plurality of upper chambers above said header plate member, each of said plurality of upper chambers communicating with at least one of said tubular members attached to each of said header plate members in an adjacent compartment in said step down counterbore of said forged burner housing;

means for sealingly covering said open end of said forged burner housing;

means for supplying a coolant fluid to said forged burner housing; and means for discharging said coolant fluid from said forged burner housing, whereby coolant fluid supplied by said means for supplying coolant flows into one of said at least two tubular members to the bottom of one of said blind holes to then flow upwards between said outside diameter of said one of said at least two tubular members and the inside diameter of said one of said blind holes until said coolant reaches said lower chamber of said recessed compartment to flow along said lower chamber into the other of said at least two blind holes so as to then flow downward between said inside diameter of said other of said at least two blind holes and said outside diameter of the other of said at least two tubular members to the bottom of said other of said blind holes so that said coolant fluid is directed to flow upward inside said other of said at least two tubular members to said upper surface of said header plate so as to be directed to flow along one of said upper chambers into an adjacent additional tubular member mounted in an adjacent recessed compartment to repeat the coolant flow described above until said coolant flow exits said tubular member of the last of said plurality of peripherally spaced recessed compartments and flow into said means for discharging said coolant fluid from said forged burner housing.

13. The forged burner enclosure apparatus as claimed in claim 12 wherein said means for supplying a coolant fluid to said forged burner forged coolant inlet fitting having an inlet port for communicating said coolant fluid to one of said upper chambers of said forged burner housing.

14. The forged burner enclosure as claimed in claim 12 wherein said means for discharging said coolant fluid further comprises a coolant outlet fitting attached to said forged burner housing, said coolant outlet fitting having an outlet port for communicating said coolant fluid from one of said upper and said lower chambers to discharge said coolant from said forged burner housing.

15. The forged burner enclosure apparatus as claimed in claim 12 wherein said means for sealingly covering said open end of said forged burner housing further comprises:
- a cover plate member sealingly mounted in said step down cavity and contiguous said divider plates attached to said upper surface of each of said header plate members, said cover plate member having an inlet aperture at one end and an outlet aperture at an opposite end thereof;
- a coolant inlet fitting mounted to said cover plate member aligned with said inlet aperture, such that coolant fluid that enters said inlet aperture directs said fluid into said inlet aperture and said upper chamber of said forged burner housing;
- a coolant outlet fitting mounted to said cover plate member aligned with said outlet aperture, whereby coolant fluid that exits one of said upper chambers and lower chambers is directed through said outlet aperture and outlet fitting.

* * * * *